United States Patent
Gole et al.

(10) Patent No.: US 10,466,907 B2
(45) Date of Patent: Nov. 5, 2019

(54) METHOD TO EFFICIENTLY STORE OBJECT DATA OF AN OBJECT STORAGE SERVICE ON A MAGNETIC DISK DRIVE AND MAGNETIC SMR DISK DRIVE

(71) Applicant: TOSHIBA MEMORY CORPORATION, Tokyo (JP)

(72) Inventors: Abhijeet Gole, Cupertino, CA (US); Ratnadeep Joshi, Sunnyvale, CA (US); Philip A. Kufeldt, San Jose, CA (US)

(73) Assignee: TOSHIBA MEMORY CORPORATION, Tokyo (JP)

( * ) Notice: Subject to any disclaimer, the term of this patent is extended or adjusted under 35 U.S.C. 154(b) by 354 days.

(21) Appl. No.: 15/077,619

(22) Filed: Mar. 22, 2016

(65) Prior Publication Data

US 2017/0277438 A1   Sep. 28, 2017

(51) Int. Cl.
    G06F 3/06         (2006.01)
(52) U.S. Cl.
    CPC ............ *G06F 3/0611* (2013.01); *G06F 3/064* (2013.01); *G06F 3/0656* (2013.01); *G06F 3/0667* (2013.01); *G06F 3/0676* (2013.01); *G06F 3/0689* (2013.01)
(58) Field of Classification Search
    None
    See application file for complete search history.

(56) References Cited

U.S. PATENT DOCUMENTS

| 4,731,680 A * | 3/1988 | Moriyama | G11B 5/556 318/634 |
| 6,317,814 B1 * | 11/2001 | Blendermann | G06F 11/2087 707/999.202 |
| 8,049,980 B1 * | 11/2011 | Emami | G11B 20/1833 360/31 |
| 8,819,375 B1 * | 8/2014 | Pruett | G06F 13/28 707/693 |
| 8,959,281 B1 * | 2/2015 | Malina | G06F 12/0246 711/103 |
| 9,229,854 B1 * | 1/2016 | Kuzmin | G06F 8/654 |
| 9,880,933 B1 * | 1/2018 | Gupta | G06F 12/0815 |

(Continued)

OTHER PUBLICATIONS

NPL_Amer Data Management and Layout for SMR 2011 (Year: 2011).*

(Continued)

*Primary Examiner* — Reginald G Bragdon
*Assistant Examiner* — Paul M Knight
(74) *Attorney, Agent, or Firm* — Kim & Stewart LLP

(57) ABSTRACT

In a data storage system, the available space of a magnetic storage device is divided into multiple sequential write regions for storing sequentially written data, where the regions are each separated from adjacent sequential write regions by a guard space. Object data, such as key-value pairs, are written sequentially to a particular sequential write region, in blocks of data that correspond to the contents of a nonvolatile buffer being flushed to the magnetic storage device. When a key-value pair stored in the magnetic storage device is subsequently updated, the original key-value pair is not overwritten. Instead, the new version of the key-value pair is included in the next block of data to be written to the magnetic storage device, and a mapping table tracks the location of the newest version of each key-value pair stored in the magnetic storage device.

20 Claims, 7 Drawing Sheets

(56) References Cited

U.S. PATENT DOCUMENTS

| | | | |
|---|---|---|---|
| 2002/0103815 A1 | 8/2002 | Duvillier et al. | |
| 2005/0071561 A1* | 3/2005 | Olsen | G06F 1/3221 711/118 |
| 2005/0228962 A1* | 10/2005 | Takase | G06F 12/0246 711/168 |
| 2011/0022801 A1* | 1/2011 | Flynn | G06F 9/52 711/120 |
| 2013/0086330 A1* | 4/2013 | Baddepudi | G06F 12/0868 711/143 |
| 2014/0055881 A1 | 2/2014 | Zaharris | |
| 2014/0177085 A1 | 6/2014 | Haga et al. | |
| 2015/0039577 A1* | 2/2015 | Talagala | G06F 9/467 707/703 |
| 2015/0178161 A1* | 6/2015 | Burd | G11B 20/1833 714/764 |
| 2015/0254144 A1* | 9/2015 | Pantel | G11B 20/1252 360/48 |
| 2016/0064030 A1* | 3/2016 | Pitchumani | G11B 20/1217 360/48 |

OTHER PUBLICATIONS

NPL_Kgil_Improving NAND Flash Based Disk Caches 2008 (Year: 2008).*
NPL_Lyons_The Use of Triple Modular Redundancy 1962 (Year: 1962).*
NPL_Pitchunnani_SMRDB Key Value Data Store for SMR Disks Seagate 2015 (Year: 2015).*
NPL_Satanicpuppy_Stack Overflow Blog_What is a battery backup cache 2013 (https://softwareengineering.stackexchange.com/questions/209813/what-is-a-battery-backup-up-cache) (Year: 2013).*
NPL_Schmid_Toms Hardware_35 vs 25_In Storage Size Matters 2010 (http://www.tomshardware.com/reviews/enterprise-storage-sas-hdd,2612.html) (Year: 2010).*
NPL_Xin_Reliability Mechanisms for Very Large Storage Systems 2003 (Year: 2003).*

* cited by examiner

METHOD TO EFFICIENTLY STORE OBJECT DATA OF AN OBJECT STORAGE SERVICE ON A MAGNETIC DISK DRIVE AND MAGNETIC SMR DISK DRIVE

BACKGROUND

The use of distributed computing systems, e.g., "cloud computing," has become increasingly common for consumers and enterprises, especially for data storage. This so-called "cloud data storage" employs large numbers of networked storage servers that are organized as a unified repository for data, and are configured as banks or arrays of magnetic hard disk drives (HDDs) and/or solid-state drives (SSDs). Typically, these servers are arranged in high-density configurations to facilitate such large-scale operation. For example, a single cloud data storage system may include thousands or tens of thousands of storage servers installed in stacked or rack-mounted arrays.

The majority of storage in cloud data storage systems is provided by HDDs, due to the low cost-to-capacity associated with such drives. To further increase the storage density of HDDs, shingled magnetic recording (SMR) has been introduced. While conventional HDDs record data by writing to non-overlapping magnetic tracks that are parallel to each other, drives using SMR write to a new track that overlaps a portion of the previously written track, so that the tracks partially overlap like roof shingles. Thus, SMR produces tracks that are narrower, allowing for higher track density and increased overall per-drive storage capacity.

However, the overlapping-tracks written using SMR greatly slows the writing of randomly located data, adding unwanted latency in any storage system that uses SMR drives. Because writing to one track overwrites an adjacent track, data can only be written sequentially to a particular group of overlapping tracks, known in the art as a "band," which is different than the normal random access behavior of traditional HDDs. To write new data to a specific location within a such a band, the entire band is read and then rewritten with the new data written in the specific location. Thus, the implementation of randomly located write commands in an SMR drive can be time-consuming and produce significant write amplification. Because latency is a critical performance parameter of cloud data storage systems, the use of SMR drives in such data storage systems can be problematic.

SUMMARY

One or more embodiments provide systems and methods that may be employed in a cloud data storage system to efficiently store object data on conventional and shingled magnetic recording (SMR) drives. According to some embodiments, the available space of a magnetic storage device is divided into multiple sequential write regions for storing sequentially written data, where the regions are each separated from adjacent sequential write regions by a guard space. Object data, such as key-value pairs, are written sequentially to a particular sequential write region, typically in blocks of data (referred to herein as "slabs") that correspond to the contents of a nonvolatile buffer being flushed to the magnetic storage device. When a key-value pair stored in the magnetic storage device is subsequently updated, the original key-value pair is not overwritten. Instead, the new version of the key-value pair is included in the next slab to be written to the magnetic storage device, and a mapping table tracks the location of the newest version of each key-value pair stored in the magnetic storage device.

A method of storing data in a data storage system that includes at least one disk drive, according to an embodiment, includes receiving a key-value pair for storage, storing the received key-value pair in a non-volatile buffer of the data storage system, recording in a table a mapping of a key of the received key-value pair to a physical location in the at least one disk drive for storing the received key-value pair, wherein the table is stored in a non-volatile storage medium of the data storage system, and after storing the received key-value pair in the non-volatile buffer and recording the mapping, storing the received key-value pair in the physical location in the at least one disk drive.

A data storage device, according to another embodiment, includes a support frame that is entirely contained within a region that conforms to a 3.5-inch form-factor disk drive specification, at least one disk drive mounted on the support frame and entirely contained within the region, a non-volatile storage medium that is entirely contained within the region, a non-volatile buffer mounted on the support frame and entirely contained within the region, and a processor that is entirely contained within the region. The processor is configured to receive a key-value pair for storage, store the received key-value pair in the non-volatile buffer, record in a table stored in the non-volatile storage medium a mapping of a key of the received key-value pair and a physical location in the at least one disk drive for storing the received key-value pair, and in response to a quantity of data stored in the non-volatile buffer exceeding a predetermined value, storing the received key-value pair in the physical location in the at least one disk drive.

DETAILED DESCRIPTION

Figure 1:
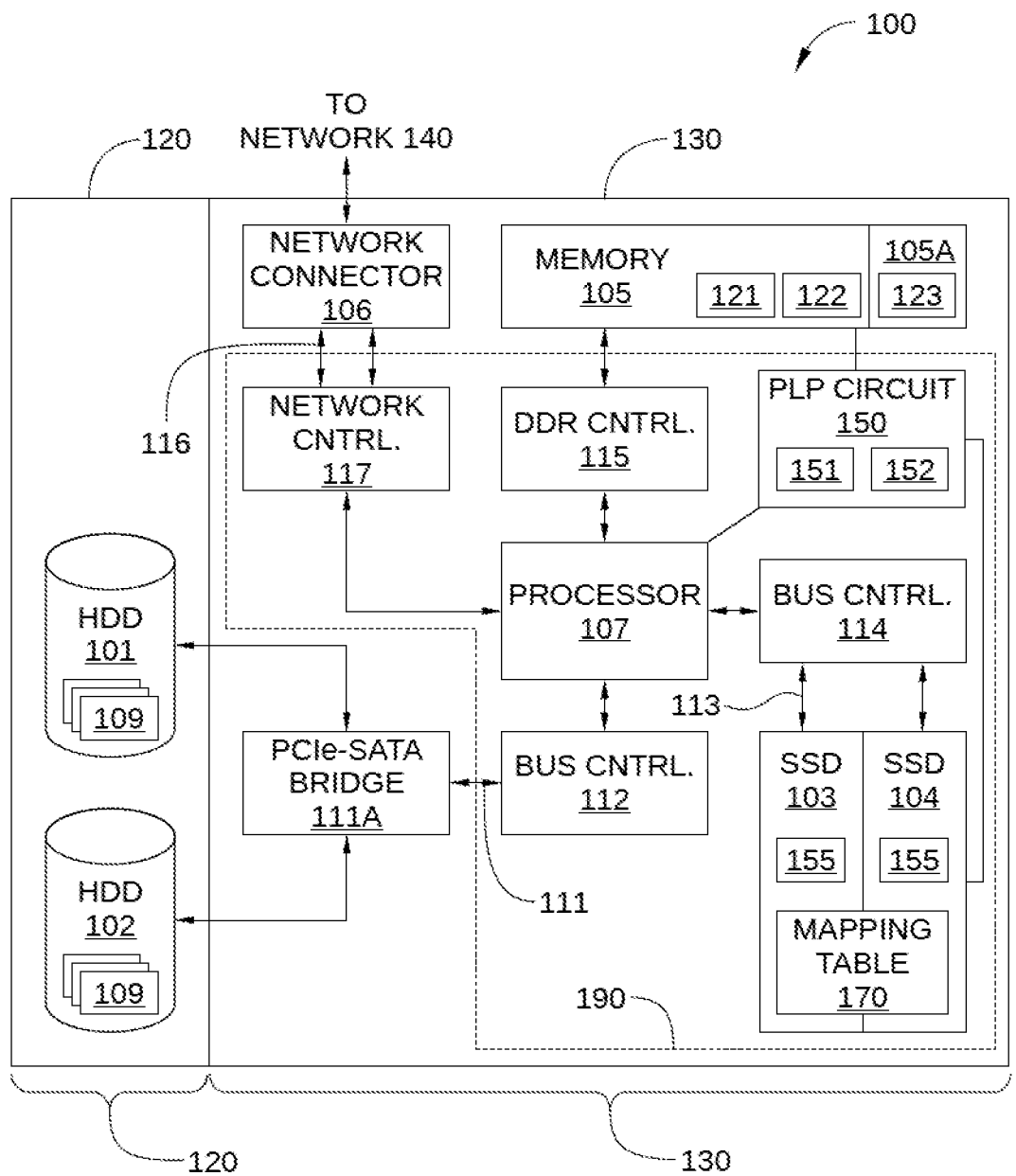
FIG. 1 is a block diagram of a data storage system, configured according to one or more embodiments.

FIG. 1 is a block diagram of a data storage system 100, configured according to one or more embodiments. Data storage system 100 may be configured to provide data storage capacity as one of a plurality of object servers of a cloud storage system (not shown), and is connected directly to a network 140. Network 140 may be any technically feasible type of communications network that allows data to be exchanged between clients and data storage system 100. For example, network 140 may include a wide area network (WAN), a local area network (LAN), a wireless (WiFi) network, and/or the Internet, among others.

In some embodiments, data storage system 100 may be an object-based storage system, which manipulates data in flexible-sized data units of storage called "objects." These objects generally include a set of data, also referred to as a "value," and an identifier, sometimes referred to as a "key", which together form a "key-value pair." In addition to the key and value, such objects may include other attributes or meta-data, for example a version number and data integrity checks of the value portion of the object. The key or other identifier facilitates storage, retrieval, and other manipulation of the associated value by data storage system 100, independent of the specific physical storage location or locations of the object in distributed storage system 100 (such as a specific location in a particular storage device). This approach simplifies and streamlines data storage in cloud computing, since a client can make data storage requests directly to a particular data storage system 100 without consulting a large data structure describing the entire addressable space of distributed storage system 100.

In the embodiment illustrated in FIG. 1, data storage system 100 includes two hard disk drives (HDDs) 101 and 102, one or more solid-state drives (SSDs) 103 and 104, a memory 105, a network connector 106, and a power loss protection (PLP) circuit 150, all connected to a processor 107 as shown. Data storage system 100 also includes a support frame 120, on which HDD 101 and HDD 102 are mounted, and a printed circuit board (PCB) 130, on which SSDs 103 and 104, memory 105, network connector 106, and processor 107 are mounted. In alternative embodiments, SSDs 103 and 104, memory 105, network connector 106, processor 107, and PLP circuit 150 may be mounted on two or more separate PCBs, rather than the single PCB 130.

HDDs 101 and 102 are magnetic disk drives that provide storage capacity for cloud storage system 100, storing data (objects 109) when requested by external clients via network 140, where each object may include one or more key-value pairs. In the embodiments illustrated herein, HDDs 101 and 102 are SMR drives, the operation of which is described in further detail below in conjunction with FIG. 5. In other embodiments, HDDs 101 and 102 may be conventional HDDs with non-overlapping tracks. HDDs 101 and 102 store objects 109 in physical locations of the magnetic media contained in HDD 101 and 102, i.e., in sectors of HDD 101 and/or 102. HDDs 101 and 102 are connected to processor 107 via a bus 111, such as a PCIe bus, and a bus controller 112, such as a PCIe controller. HDDs 101 and 102 may each be a 2.5-inch form-factor HDD that is configured to conform to the 2.5-inch form-factor specification for HDDs (i.e., the so-called SFF-8201 specification). HDDs 101 and 102 are arranged on support frame 120 so that they conform to the 3.5-inch form-factor specification for HDDs (i.e., the so-called SFF-8301 specification), as shown in FIG. 2.

Figure 2:
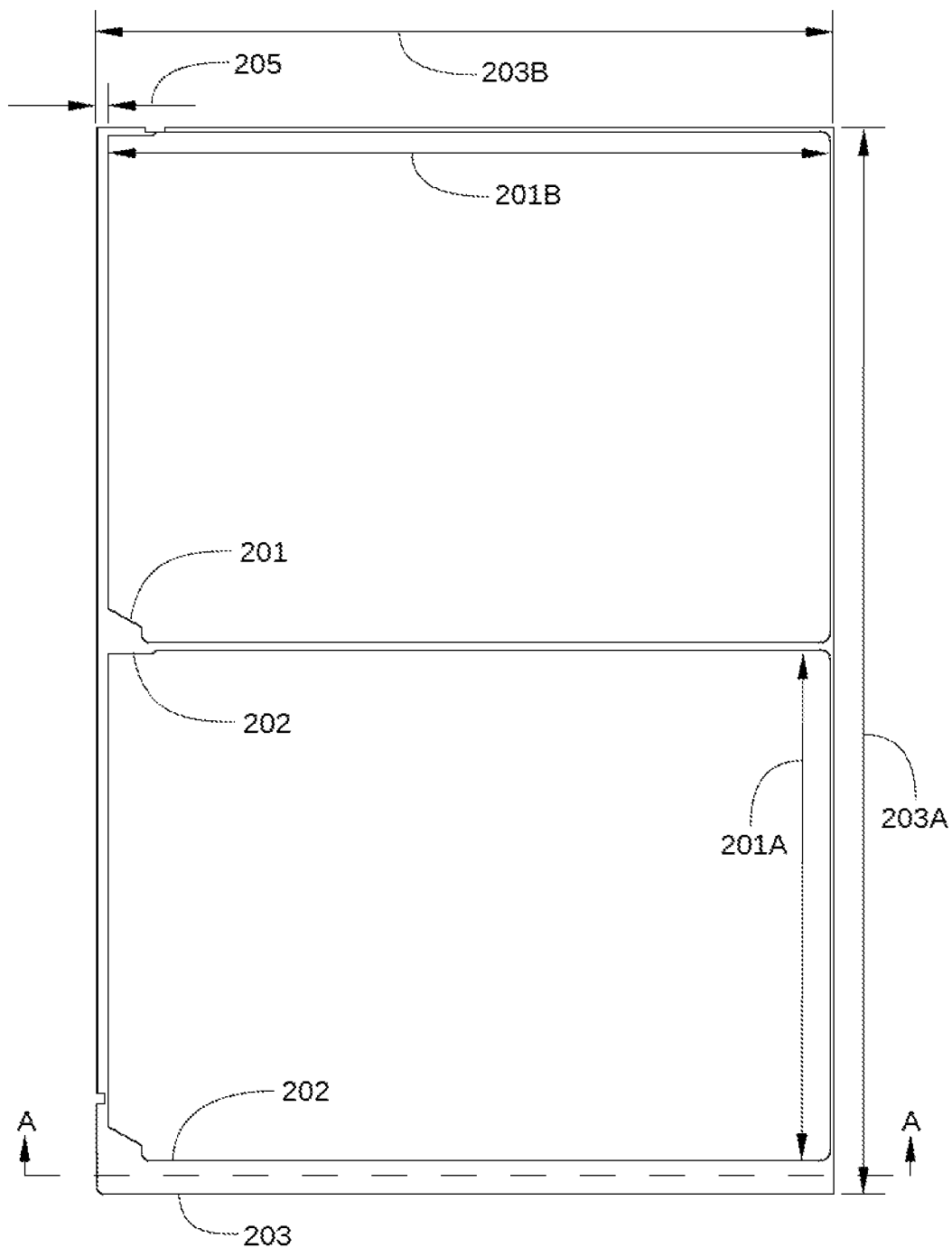
FIG. 2 schematically illustrates a plan view of the respective footprints of two hard disk drives included in the data storage system of FIG. 1 that are superimposed onto a footprint of a support frame for the data storage system of FIG. 1.

FIG. 2 schematically illustrates a plan view of a footprint 201 of HDD 101 and a footprint 202 of HDD 102 superimposed onto a footprint 203 of support frame 120 in FIG. 1, according to one or more embodiments. In this context, the "footprint" of support frame 120 refers to the total area of support frame 120 visible in plan view and bounded by the outer dimensions of support frame 120, i.e., the area contained within the extents of the outer dimensions of support frame 120. Similarly, footprint 201 indicates the area contained within the extents of the outer dimensions of HDD 101, and footprint 202 indicates the area contained within the extents of the outer dimensions of HDD 102. It is noted that footprint 203 of support frame 120 corresponds to the form factor of a 3.5-inch form factor HDD, and therefore has a length 203A up to about 100.45 mm and a width 203B of up to about 70.1 mm. Footprint 201 of HDD 101 and footprint 202 of HDD 102 each correspond to the form factor of a 2.5-inch form factor HDD and therefore each have a width 201A no greater than about 101.35 mm and a length 201B no greater than about 147.0 mm. Thus, width 203B of support frame 120 can accommodate length 201B of a 2.5-inch form factor HDD and length 203A of support frame 120 can accommodate the width 201A of two 2.5-inch form factor HDDs, as shown.

Returning to FIG. 1, SSD 103 and 104 are each connected to processor 107 via a bus 113, such as a SATA bus, and a bus controller 114, such as a SATA controller. SSDs 103 and 104 are configured to store a mapping table 170 that associates each object 109 with a set of logical block addresses (LBAs) of HDD 101 and/or HDD 102, where each LBA corresponds to a unique physical location in either HDD 101 or HDD 102 that is part of the addressable space of data storage system 100. Thus, whenever a new object 109 is stored in HDD 101 and/or HDD 102, mapping table 170 is updated, for example by host software 121. Mapping table 170 may be partially stored in SSD 103 and partially stored in SSD 104, as shown in FIG. 1. Alternatively, mapping table 170 may be stored entirely in SSD 103 or entirely in SSD 104. Because mapping table 170 is not stored on HDD 101 or HDD 102, mapping table 170 can be updated more quickly and without causing HDD 101 or HDD 102 to interrupt the writing of object data to perform the updating of mapping table 170.

Because the combined storage capacity of HDD 101 and HDD 102 can be 6 TB or more, mapping table 170 may occupy a relatively large portion of SSD 103 and/or SSD 104, and SSDs 103 and 104 are sized accordingly. For example, in an embodiment of data storage system 100 configured for 4 KB objects (i.e., 250 objects per MB), assuming that 8 bytes are needed to map each object plus an additional 16 bytes for a UUID, mapping table 170 can have a size of 78 GB or more. In such an embodiment, SSDs 103 and 104 may each be a 240 GB M.2 form-factor SSD, which can be readily accommodated by PCB 130.

In some embodiments, SSDs 103 and 104 are also configured to include one or more reserved regions 155 for storing data copied from from a nonvolatile buffer 123 in memory 105 in the event of unexpected power loss. More specifically, when power loss is detected, reserved regions 155 may be configured to store key-value pairs recently received by data storage system 100 from external clients and stored in nonvolatile buffer 123, thereby effectively making a portion of volatile memory 105 a nonvolatile buffer. The operation of such a nonvolatile buffer, and of PLP circuit 150 in response to unexpected power loss, is described below.

Memory 105 includes one or more solid-state memory devices or chips, such as an array of volatile dynamic random-access memory (DRAM) chips. For example, in some embodiments, memory 105 includes four or more double data rate (DDR) memory chips. In such embodiments, memory 105 is connected to processor 107 via a DDR controller 115. In some embodiments, memory 105 may include a nonvolatile RAM section 105A, or be comprised entirely of non-volatile RAM. Although typically formed with volatile RAM, such as dynamic RAM, non-volatile RAM section 105A can be considered nonvolatile because memory 105, processor 107, and SSD 103 and/or 104 are all coupled to PLP circuit 150. Consequently, upon detection of power loss to data storage system 100, data stored in nonvolatile RAM section 105A can be stored in one or more reserved regions 155 in SSDs 103 and/or 104, and is not lost despite the loss of power to data storage system 100.

During operation, host software 121 and object service software 122 may reside in memory 105, and nonvolatile buffer 123 may reside in nonvolatile RAM section 105A. Host software 121 is configured to perform management tasks associated with cloud storage system 100 and thereby provide the functionality of a host or object server that receives GET, PUT, and DELETE commands from clients via network 140. Object service software 122 is configured to enable various embodiments described herein, including efficiently storing object data received from clients external to data storage system 100 in HDDs 101 and 102. Nonvolatile buffer 123 is configured to store key-value pairs received from a client or clients external to data storage system 100, in particular the most recently received key-value pairs.

Network connector 106 enables one or more network cables to be connected to data storage system 100 and thereby connected to network 140. For example, network connector 106 may be a modified SFF-8482 connector. As shown, network connector 106 is connected to processor 107 via a bus 116, for example one or more serial gigabit media independent interfaces (SGMII), and a network controller 117, such as an Ethernet controller, which controls network communications from and to data storage system 100.

Processor 107 may be any suitable processor implemented as a single core or multi-core central processing unit (CPU), a graphics processing unit (GPU), an application-specific integrated circuit (ASIC), a field programmable gate array (FPGA), or another type of processing unit. Processor 107 is configured to execute program instructions associated with the operation of data storage system 100 as an object server of cloud storage system 100, including receiving data from and transmitting data to clients external to cloud storage system 100, buffering received key-value pairs in nonvolatile buffer 123, and recording a mapping of each received key to a physical location in HDD 101 or 102 in mapping table 170. In some embodiments, processor 107 and one or more other elements of data storage system 100 may be formed as a single chip, such as a system-on-chip (SOC) 190. In the embodiment illustrated in FIG. 1, SOC 190 includes bus controller 112, bus controller 114, DDR controller 115, and network controller 117. Furthermore, in some embodiments, processor 107 may be shared for use by other functions of data storage system 100, such as managing the mechanical functions of HDDs 101 and 102 and/or the data storage functions of SSDs 103 and 104.

PLP circuit 150 is configured to power memory 105 or nonvolatile RAM section 105A, processor 107, and SSDs 103 and 104 for a short but known time interval, thereby allowing data stored in memory 105 to be copied to the one or more reserved regions 155 of SSDs 103 and/or 104 in the event of unexpected power loss. Advantageously, a portion of memory 105 can be employed as a smaller, but much faster mass storage device than SSDs 103 or 104, since DRAM write operations are typically performed orders of magnitude faster than NAND write operations. Thus, processor 107 may cause data received by data storage system 100 from an external client to be initially stored in memory 105 rather than in SSDs 103 or 104; PLP circuit 150 allows some or all of memory 105 to temporarily function as non-volatile memory, and data stored therein will not be lost in the event of unexpected power loss to data storage system 100. As shown, PLP circuit 150 includes a management integrated circuit (IC) 151 and a temporary power source 152.

Management IC 151 is configured to monitor an external power source (not shown) and temporary power source 152, and to alert processor 107 of the status of each. Management IC 151 is configured to detect interruption of power from the external power source, to alert processor 107 of the interruption of power, and to switch temporary power source 152 from an "accept power" mode to a "provide power" mode. Thus, when an interruption of power from the external power source is detected, data storage system 100 can continue to operate for a finite time, for example a few seconds or minutes, depending on the charge capacity of temporary power source 152. During such a time, processor 107 can copy data stored in memory 105 to reserved regions 155 of SSD 103 or 104. Furthermore, upon power restoration from the external power source, PLP circuit 150 is configured to copy data stored in reserved regions 155 back to memory 105.

Management IC 151 also monitors the status of temporary power source 152, notifying processor 107 when temporary power source 152 has sufficient charge to power processor 107, memory 105, and SSDs 103 and 104 for a minimum target time. Generally, the minimum target time is a time period that is at least as long as a time required for processor 107 to copy data stored in memory 105 to reserved region 155. For example, in an embodiment in which the storage capacity of memory 105 is approximately 1 gigabyte (GB) and the data rate of SSD 103 and 104 is approximately 650 megabytes (MBs) per second, the minimum target time may be up to about two seconds. Thus, when management IC 151 determines that temporary power source 152 has insufficient charge to provide power to processor 107, memory 105, and SSDs 103 and 104 for two seconds, management IC 151 notifies processor 107. In some embodiments, when temporary power source 152 has insufficient charge to power processor 107, memory 105, and SSDs 103 and 104 for the minimum target time, processor 107 does not make memory 105 available for temporarily storing write data.

Temporary power source 152 may be any technically feasible device capable of providing electrical power to processor 107, memory 105, and SSDs 103 and 104 for a finite period of time, as described above. Suitable devices includes rechargeable batteries, dielectric capacitors, and electrochemical capacitors (also referred to as "supercapacitors"). The size, configuration, and power storage capacity of temporary power source 152 depends on a plurality of factors, including power use of SSDs 103 and 104, the data storage capacity of memory 105, the data rate of SSDs 103 and 104, and space available for temporary power source 152. One of skill in the art, upon reading this disclosure herein, can readily determine a suitable size, configuration, and power storage capacity of temporary power source 152 for a particular embodiment of data storage system 100.

Figure 3:
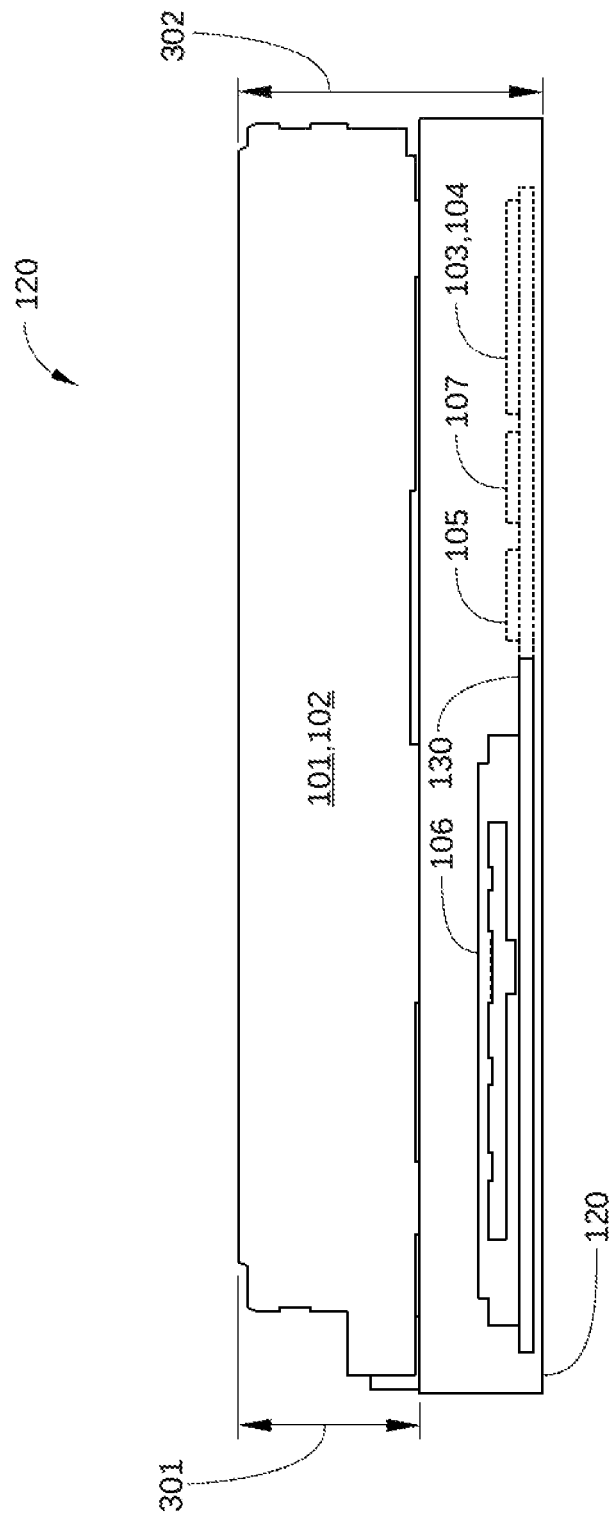
FIG. 3 schematically illustrates a side view of the data storage system of FIG. 2 taken at section A-A.

FIG. 3 schematically illustrates a side view of data storage system 100 taken at section A-A in FIG. 2. As shown in FIG. 3, HDD 101 and 102 are mounted on support frame 120. Because thickness 301 of HDDs 101 and 102 (according to SFF-8201) is approximately either 17 or 19 mm, and because thickness 302 of data storage system 100 (according to SFF-8301) is approximately 26 mm, PCB 130 can be connected to and mounted below support frame 120 and HDDs 101 and 102. For example, in one embodiment, PCB 130 is oriented parallel to a plane defined by HDDs 101 and 102. Thus, PCB-mounted components of data storage system 100, e.g., SSDs 103 and 104, memory 105, network connector 106, and/or processor 107, can be disposed under HDD 101 and HDD 102 as shown in FIG. 3. In FIG. 3, PCB 130 is only partially visible and is partially obscured by support frame 120, and SSDs 103 and 104, memory 105, and processor 107 are completely obscured by support frame 120.

Figure 4:
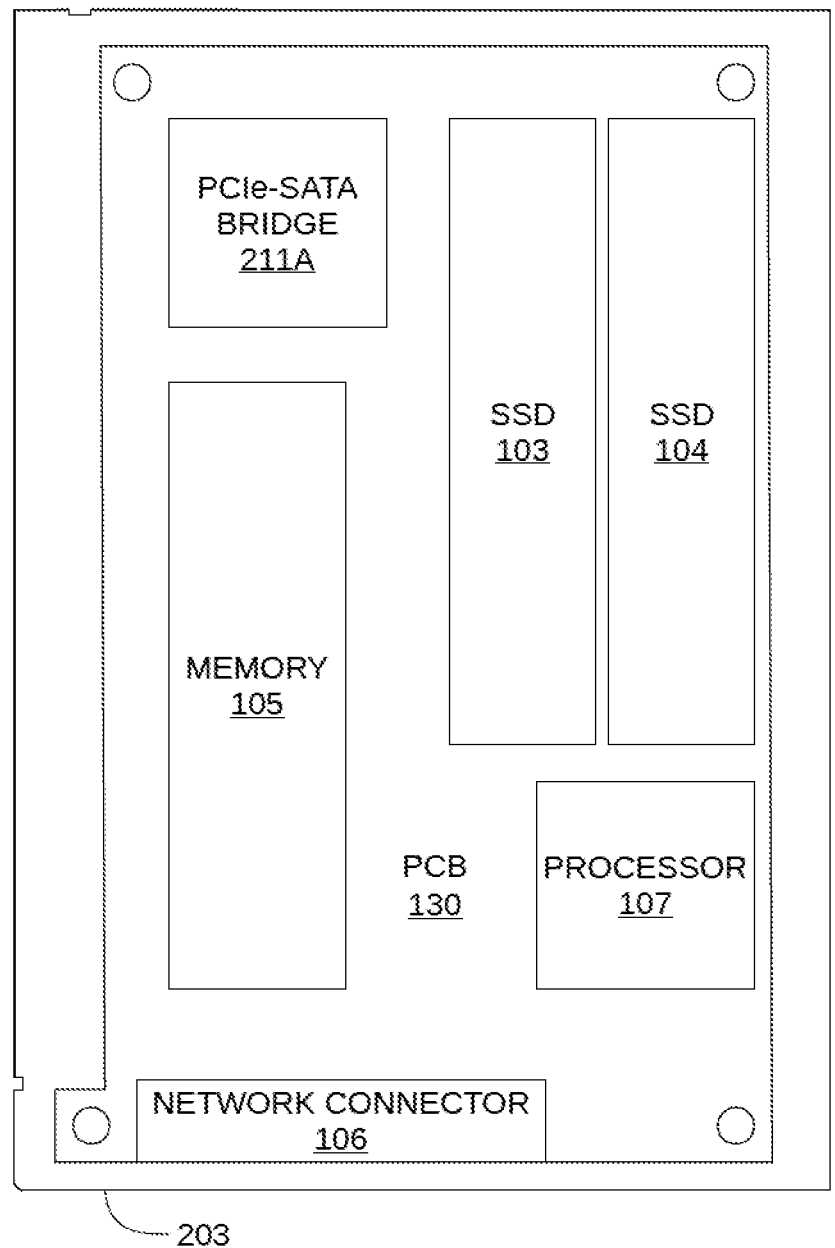
FIG. 4 schematically illustrates a plan view of the printed circuit board of FIG. 1, according to one or more embodiments.

FIG. 4 schematically illustrates a plan view of PCB 130, according to one or more embodiments. As shown, various PCB-mounted components of data storage system 100 are connected to PCB 130, including SSDs 103 and 104, memory 105, network connector 106, and either SOC 190 or processor 107. Although not illustrated in FIG. 4, portions of bus 111, bus 113, and bus 116 may also be formed on PCB 130.

Figure 5:
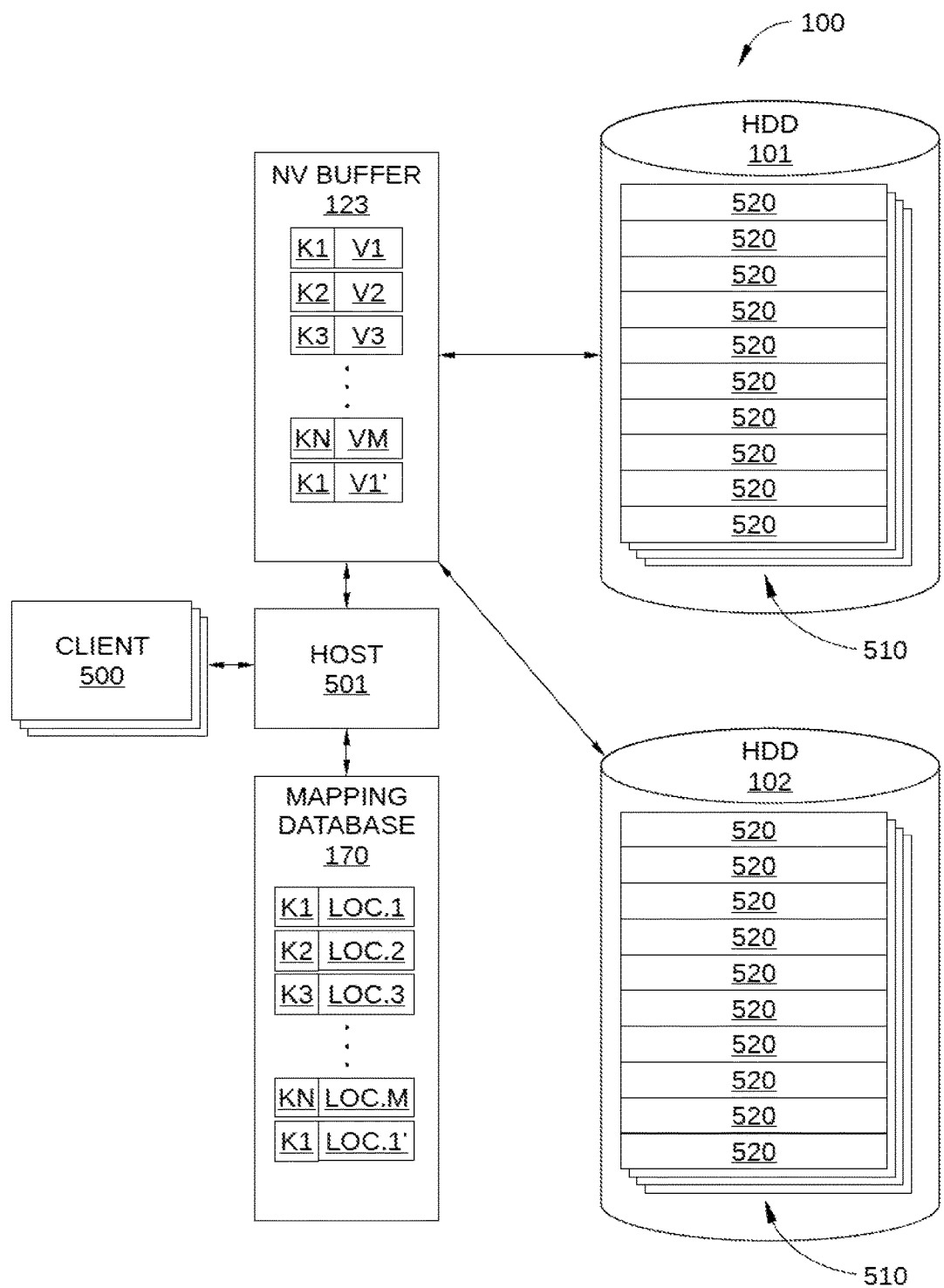
FIG. 5 is a block diagram illustrating the storage of object data received by the data storage system of FIG. 1 from one or more external clients, according to one or more embodiments.

FIG. 5 is a block diagram illustrating the storage of object data received by data storage system 100 from one or more external clients 500, according to one or more embodiments. As shown, nonvolatile buffer 123 is configured to store a plurality of key-value pairs K1-V1, K2-V2, ... KN-VM received from one or more external clients 500 by a host 501 associated with data storage device 100. For example, each of clients 500 may be a web-based application or any other technically feasible storage client, and host 501 may be host software 121 and/or object service software 122 running on processor 107 in FIG. 1. Mapping table 170 is configured to store a mapping of keys K1-KN to respective locations 1-M. For ease of description, keys K1-KN are depicted as listed in mapping table 170 in the order received by data storage system 100.

HDDs 101 and 102 are each configured to include a plurality of sequential write regions 510. Each of sequential write regions 510 is a contiguous area of HDD 101 or HDD 102, such as a group of adjacent data tracks, and includes multiple slabs 520 for storing data. In some embodiments, each sequential write region 510 corresponds in size and configuration to a shingled magnetic recording (SMR) "band" or "zone." Thus, in such embodiments, each sequential write region 510 includes a plurality of slightly overlapping data tracks, and is separated from adjacent sequential write regions 510 by a guard space. By contrast, slabs 520 are generally not separated by a guard space, so that the final sector of one slab 520 is adjacent to the first sector of the immediately following slab 520. Sequential write regions 510 may be on the order of 256 MB or larger. In some embodiments, each slab 520 is sized to store the same quantity of data as nonvolatile buffer 123, so that each slab 520 can store the entire contents of nonvolatile buffer 123 when flushed. For example, in some embodiments, nonvolatile buffer 123 and each slab 520 may be sized to store 16 MB or 32 MB of data.

Locations 1-M are physical locations in HDD 101 or HDD 102 that are assigned for storing key-value pairs. In general, each of locations 1-M is selected to include the next available sectors in HDD 101 or HDD 102 for storing object data. In the embodiment illustrated in FIG. 5, key K1 of key-value pair K1-V1 is mapped to location 1 in mapping table 170, and location 1 is therefore assigned to store the value V1 of key-value pair K1-V1. Similarly, key K2 of key-value pair K2-V2 is mapped to location 2, which is assigned to store the value V2 of key-value pair K2-V2, key K3 of key-value pair K3-V3 is mapped to location 3, which is assigned to store the value V3 of key-value pair K3-V3, and so on. Because key K2 is the first key received after key K1, location 2 includes the sector or sectors of HDD 101 or HDD 102 immediately following the sectors of location 1. In the same vein, because key K3 is the first key received after key K2, location 3 includes the sector or sectors immediately following sectors of location 2. Thus, when the contents of nonvolatile buffer 123 are flushed to locations 1-N in HDD 101 or HDD 102, such contents can be written in a single sequential write operation.

It is well-known in the art that a quantity of data can be stored by a magnetic storage device at a significantly higher rate in a single sequential write than as a large number of randomly located writes. Therefore, by buffering received key-value pairs in nonvolatile buffer 123, and writing the contents of nonvolatile buffer 123 to HDD 101 or 102 in a single sequential write operation, data storage system 100 can efficiently store object data received from clients 500, freeing HDD 101 and 102 to perform other tasks as data are buffered in nonvolatile buffer 123. For example, HDD 101 or HDD 102 can perform a compaction process on one or more sequential write regions 510 as data are buffered in nonvolatile buffer 123.

The number M of locations mapped by data storage device 100 in mapping table 170 is a function of the total data storage capacity of HDDs 101 and 102 and the minimum size of key-value pairs accepted by data storage device 100. Given that the data storage capacity of HDDs 101 and 102 may be on the order of several terabytes, M may have a value on the order of 10 s or 100 s of millions. Locations 1-M may be indicated in any suitable fashion in mapping table 170, for example by a sequential group of LBAs that correspond to the next available sectors in HDD 101 or HDD 102, or an offset and number of sectors suitable for storing the data mapped to that location.

When assigned for storing a specific key-value pair, each of locations 1-M is disposed within a sequential write region 510 that is either empty or active, and is not disposed within a sequential write region 510 that is either occupied or compacting. A sequential write region 510 is in an empty state when no key-value pairs are stored therein, and is therefore available for storing key-value pairs. A sequential write region 510 is in an active state when key-value pairs are stored therein, but there is still available storage capacity for storing additional key-value pairs, for example, when one or more slabs in that particular sequential write region 510 are empty and available for storing key-value pairs flushed from nonvolatile buffer 123. A sequential write region 510 is in an occupied state when key-value pairs are stored therein and there is no available storage capacity for storing additional key-value pairs, for example, when all slabs 520 in that particular sequential write region 510 store key-value pairs that have been flushed from nonvolatile buffer 123. In some embodiments, only a single sequential write region 510 may be in an active state in each of HDDs 101 and 102. In other embodiments, multiple sequential write regions 510 may be in an active state in a particular HDD.

Figure 6:
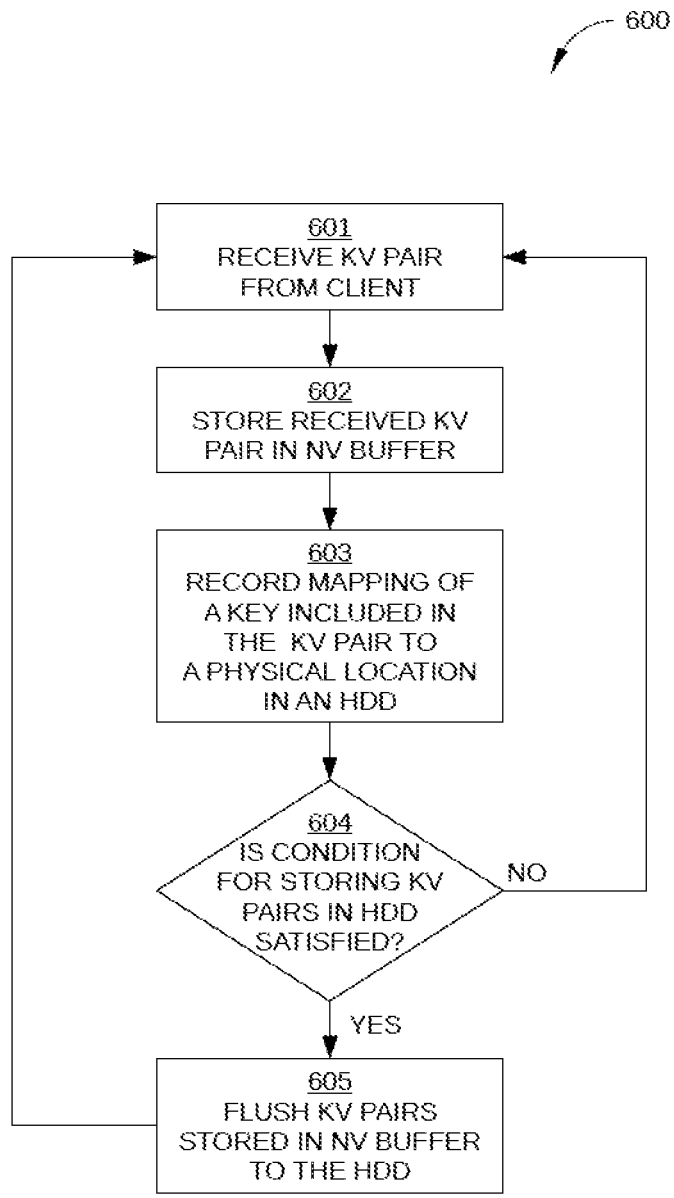
FIG. 6 sets forth a flowchart of method steps carried out by a data storage system when storing data, according to one or more embodiments.

FIG. 6 sets forth a flowchart of method steps carried out by data storage system 100 when storing data, according to one or more embodiments. Although the method steps are described in conjunction with data storage system 100 of FIGS. 1-5, persons skilled in the art will understand that the method in FIG. 6 may also be performed with other types of computing systems.

As shown, method 600 begins at step 601, in which data storage system 100 receives object data, such as a key-value pair, from one of clients 500 via network 140. For example, data storage device 100 may receive a PUT command that includes key-value pair K1-V1 from one of clients 500. As shown in FIG. 5, key-value pair K1-V1 includes a key K1 and a value V1.

In step 602, data storage system 100 stores the key-value pair received in step 601, e.g., key-value pair K1-V1, in nonvolatile buffer 123. Because the key-value pair K1-V1 will not be lost in the event of unexpected loss of power to data storage system 100, these data are effectively stored in a nonvolatile medium in step 602. Consequently, data storage system 100 can return an acknowledgement to client 500 that the PUT command very soon after the key-value pair K1-V1 is stored in nonvolatile buffer 123, i.e, as soon as mapping table 170 is updated with the unique physical location in either HDD 101 or HDD 102 associated with key-value pair K1-V1. Thus, by initially storing received key-value pairs in nonvolatile buffer 123, data storage system 100 greatly reduces the latency of PUT commands to data storage system 100. For example, data storage can be executed very quickly in nonvolatile buffer 123 (for example on the order of nanoseconds) relative to data storage in SSDs 103 and 104 (which may require a few microseconds) and data storage in HDDs 101 and 102 (which may require as much as tens of milliseconds).

In step 603, data storage system 100 maps the key of the key-value pair received in step 601 (e.g., key K1) to a physical location in HDD 101 or HDD 102 (e.g., location 1), by recording a suitable entry in mapping table 170. As described above, the physical location mapped to the key of the received key-value pair includes the next available sectors in HDD 101 or HDD 102, so that the contents of nonvolatile buffer 123 can be flushed to HDD 101 or HDD 102 in a single sequential write.

It is noted that mapping table 170 may include more than one location mapped to a particular key, since a key-value pair stored in data storage system 100 may be updated at any time by a client 500. For example, host 501 may receive a key-value pair at one time, then receive a later version of the same key-value pair at a later time. Thus, referring to FIG. 5, host 501 first receives key-value pair K1-V1 and maps location 1 to key K1, then subsequently receives an updated version of key-value pair K1-V1, i.e., key-value pair K1-V1'. In key-value pair K1-V1', the value has been modified to value V1'. After receiving key-value pair K1-V1', data storage device 100 maps key K1 to a different physical location in HDD 101 or HDD 102, i.e., location 1', which is used to store value V1'. Therefore, the value V1' is returned to client 500 when a GET command that includes key K1 is received by data storage system 100. Thus, as operation of data storage system 100 continues, data storage device 100 receives additional object data from one or more of clients 500 that may include new keys or keys that are already mapped to a physical location in HDD 101 or HDD 102. However, in step 603, the same procedure is followed, whether or not the key of a key-value received in step 601 is already stored in mapping table 170.

In step 604, data storage system 100 determines whether a condition is satisfied for storing, in HDD 101 or HDD 102, the key-value pairs that are currently stored in nonvolatile buffer 123. That is, data storage system 100 determines whether or not nonvolatile buffer 123 should be flushed to HDD 101 or HDD 102. In some embodiments, such condition is satisfied when a used capacity of nonvolatile buffer 123 is greater than a threshold capacity of nonvolatile RAM section 105A. For example, in some embodiments, such a threshold capacity may be on the order of 16 MB, 32 MB, or more, depending on the configuration of PLP circuit 150 and temporary power source 152. If the condition is determined to be satisfied, method 600 proceeds to step 605; if not, method 600 proceeds back to step 601.

In step 605, data storage system 100 flushes the key-value pairs stored in nonvolatile buffer 123 to HDD 101 or HDD 102, then deletes the contents of nonvolatile buffer 123. Thus, data storage system 100 stores each key-value pair stored in nonvolatile buffer 123 to an appropriate physical location in HDD 101 or HDD 102, i.e., the physical location mapped to the key associated with that key-value pair. For example, referring to FIG. 5, host 501 causes value V1' to be written to location 1', value V2 to be written to location 2, value V3 to be written to location 3, and so on. It is noted that value V1 is not written to location 1, since value V1 is associated with an older version of key-value pair K1-V1. Because locations 1-M in mapping table 170 are selected for each new key-value pair to be the next available sectors of HDD 101 or HDD 102, the contents of nonvolatile buffer 123 can be written to HDD 101 or HDD 102 in a single sequential write operation. Nonvolatile buffer 123 is then available to store additional key-value pairs received from clients 500.

In some embodiments, the latency of GET commands received from clients 500 is reduced by data storage device 100. One such embodiment is described in conjunction with FIG. 7.

Figure 7:
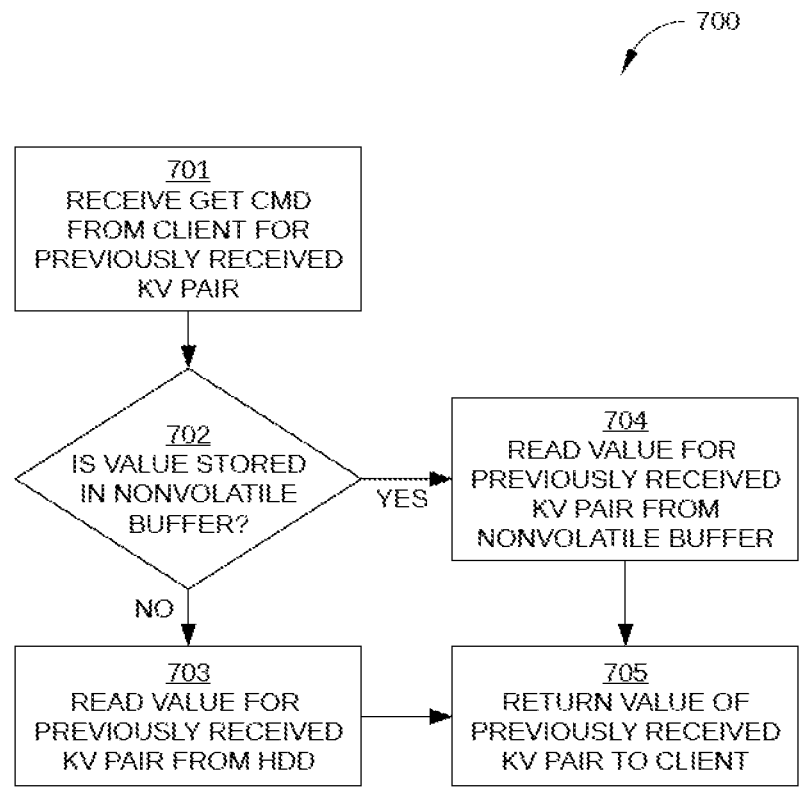
FIG. 7 sets forth a flowchart of method steps carried out by a data storage system when retrieving data, according to one or more embodiments.

FIG. 7 sets forth a flowchart of method steps carried out by data storage system 100 when retrieving data, according to one or more embodiments. Although the method steps are described in conjunction with data storage system 100 of FIGS. 1-5, persons skilled in the art will understand that the method in FIG. 7 may also be performed with other types of data storage systems.

As shown, a method 700 begins at step 701, in which data storage system 100 receives a GET command from a client 500 to retrieve a value for a key-value pair received previously by data storage system 100. Generally, such a GET command includes a key for a key-value pair, where the value of the key-value pair is the data requested by client 500.

In step 702, data storage system 100 determines whether or not the value for the previously received key-value pair is stored in nonvolatile buffer 123. For example, in some embodiments, data storage system 100 searches the contents of nonvolatile buffer 123 for the key included in the GET command received in step 701. In response to determining that the value for the previously received key-value pair is not stored in non-volatile buffer 123, method 700 proceeds to step 703. In response to determining that the value for the previously received key-value pair is stored in non-volatile buffer 123, method 700 proceeds to step 704.

In step 703, data storage system 100 reads the value for the previously received key-value pair from the appropriate physical location in HDD 101 or HDD 102. The appropriate physical location is determined based on the location in mapping table 170 that is mapped to the key included in the GET command received in step 701. Because the keys in mapping table 170 are searched in order of recency, the most recent location mapped to a particular key is found before any older locations that are mapped to that particular key. Therefore, the location of the most recent version of the value associated with that particular key is used for reading the value of the previously received key-value pair. Method 700 then proceeds to step 705. In step 704, data storage system 100 reads the value for the previously received key-value pair from non-volatile buffer 123, rather than reading the value from HDD 101 or HDD 102. In step 705, data storage system 100 returns the value to the client 500.

In some embodiments, a compaction process is performed in data storage system 100 when a condition of a particular sequential write region 510 in FIG. 5 is determined to be satisfied. For example, in some embodiments, such a condition may be satisfied when a portion of the sequential write region 510 that is storing invalid data (e.g., older versions of values) is determined to be greater than a threshold value. For example, in some embodiments, when a portion of a particular sequential write region 510 storing invalid data exceeds 90%, data storage system 100 initiates a compaction process on the sequential write region 510.

In some embodiments, when a compaction process begins, data storage system 100 selects a first key of a key-value pair stored in the sequential write region 510 undergoing the compaction process. Data storage system 100 then determines whether or not the location of the selected key-value pair is the same location currently mapped to the key of the selected key-value pair, for example by consulting mapping table 170. If so, data storage system 100 stores the selected key-value pair in non-volatile buffer 123 in the same way that a key-value pair received from client 500 is stored, and, after the valid key-value entry is stored in non-volatile buffer 123, data storage system 100 also stores the new mapping for the selected key-value pair in mapping table 170. If not, no action is taken with the selected key-value pair. This process is then repeated for all key-value pairs stored in the sequential write region 510 undergoing the compaction process. Data storage system 100 then initializes the sequential write region 510 undergoing the compaction process, thereby making this particular sequential write region 510 available for storing data.

In sum, embodiments described herein provide systems and methods suitable for use in a cloud storage system to efficiently store object data on conventional and shingled magnetic recording (SMR) drives. Because object data are initially stored in a nonvolatile buffer rather than a flash memory device or a magnetic disk drive, latency of the data storage system is greatly reduced. In addition, object data are subsequently written to magnetic disk drives from the nonvolatile buffer as a single sequential write when the nonvolatile buffer is filled. Consequently, an SMR drive can be used to store such object data without the latency associated with writing data to random locations in an SMR drive.

While the foregoing is directed to embodiments of the present invention, other and further embodiments of the invention may be devised without departing from the basic scope thereof, and the scope thereof is determined by the claims that follow.

We claim:

1. A method of storing data in a data storage system that includes at least one disk drive, the method comprising:
   receiving a key-value pair for storage from a client;
   storing the received key-value pair in a first non-volatile memory of the data storage system;
   prior to storing the received key-value pair in the at least one disk drive, recording in a table stored in a second non-volatile memory of the data storage system, a mapping of a key of the key-value pair received and stored in the first non-volatile memory to a physical location in the at least one disk drive at which the key-value pair is to be stored;
   responsive to storing the received key-value pair in the first non-volatile memory and recording the mapping in the table stored in the second non-volatile memory, returning an acknowledgement to the client; and
   after storing the received key-value pair in the first non-volatile memory and recording the mapping, storing the received key-value pair in the physical location in the at least one disk drive.

2. The method of claim 1, further comprising:
   receiving one or more additional key-value pairs;
   storing the received one or more additional key-value pairs in the first non-volatile memory;
   for each of the one or more received additional key-value pairs, recording in the table a mapping of a key of the received additional key-value pair and a respective physical location in the at least one disk drive determined for the received additional key-value pair; and
   after storing the one or more additional received key-value pairs in the first non-volatile memory and recording the mapping of the key of the received additional key-value pair and the respective physical location, storing each of the one or more received additional key-value pairs in the respective physical location.

3. The method of claim 2, further comprising:
   prior to storing the received additional key-value pairs in the respective physical locations in the at least one disk drive, determining that a condition for storing the received additional key-value pairs in the respective physical locations in the at least one disk drive is satisfied.

4. The method of claim 3, wherein the condition is satisfied when a used capacity of the first non-volatile memory is greater than a threshold capacity.

5. The method of claim 4, further comprising, after storing each of the one or more received additional key-value pairs in the respective physical location in the at least one disk drive, deleting the contents of the first non-volatile memory.

6. The method of claim 3, further comprising:
   upon determining that the condition is satisfied, determining the respective physical locations for the received additional key-value pairs in the at least one disk drive.

7. The method of claim 6, wherein the physical locations in the at least one disk drive are contiguous in the at least one disk drive.

8. The method of claim 7, wherein the received key-value pairs are stored in the contiguous physical locations of the at least one disk drive in a single sequential write operation.

9. The method of claim 8, wherein the at least one disk drive comprises a shingled magnetic recording region of the at least one disk drive.

10. The method of claim 1, further comprising:
    receiving a command from the client to retrieve the value for the received key-value pair;
    upon receiving the command from the client, determining whether or not the value for the received key-value pair is stored in the first non-volatile memory;
    in response to determining that the value for the received key-value pair is stored in the first non-volatile memory, reading the value for the received key-value pair from the first non-volatile memory; and
    in response to determining that the value for the received key-value pair is not stored in the first non-volatile memory, reading the value for the received key-value pair from the physical location in the at least one disk drive.

11. The method of claim 1, wherein the table associates logical block addresses (LBAs) of the one or more disk drives with a plurality of objects stored on the one or more disk drives.

12. The method of claim 1, wherein the physical location in the at least one disk drive corresponds to a set of logical block addresses that are associated with an addressable space of the at least one disk drive.

13. The method of claim 1, further comprising:
after recording the key of the received key-value pair and the physical location in the table, receiving an updated key-value pair for storage, wherein the updated key-value pair includes the same key as the received key-value pair; and
recording in the table the key of the received key-value pair and a new physical location in the at least one disk drive for storing the updated key-value pair.

14. A data storage device comprising:
a support frame that is entirely contained within a region that conforms to a 3.5-inch form-factor disk drive specification;
at least one disk drive mounted on the support frame and entirely contained within the region;
a first non-volatile memory mounted on the support frame and entirely contained within the region;
a second non-volatile memory entirely contained within the region and;
a processor that is entirely contained within the region and is configured to:
  receive a key-value pair for storage from a client;
  store the received key-value pair in the first non-volatile memory;
  prior to storing the received key-value pair in the at least one disk drive, record in a table stored in the second non-volatile memory, a mapping of a key of the key-value pair received and stored in the first non-volatile memory and a physical location in the at least one disk drive at which the key-value pair is to be stored;
  responsive to storing the received key-value pair in the first non-volatile memory and recording the mapping in the table stored in the second non-volatile memory, return an acknowledgement to the client; and
  in response to a quantity of data stored in the first non-volatile memory exceeding a predetermined value, storing the received key-value pair in the physical location in the at least one disk drive.

15. The data storage device of claim 14, wherein the at least one disk drive comprises a 2.5-inch form factor disk drive.

16. The data storage device of claim 14, further comprising a second 2.5-inch form factor disk drive mounted on the support frame and entirely contained within the region.

17. The data storage device of claim 16, wherein the physical location in the at least one disk drive corresponds to a set of logical block addresses that are associated with an addressable space of the at least one disk drive or the second 2.5-inch form factor disk drive.

18. The data storage device of claim 14, wherein the physical location in the at least one disk drive corresponds to a set of logical block addresses that are associated with an addressable space of the at least one disk drive.

19. The data storage device of claim 14, wherein the first non-volatile memory comprises a random-access memory device coupled to a power loss protection circuit.

20. The data storage device of claim 14, wherein the second non-volatile memory is a flash memory device having a greater storage size and slower access speed than the first non-volatile memory.

* * * * *